United States Patent

[11] 3,554,527

| [72] | Inventor | Lester G. Hall |
| | | Los Angeles, Calif. |
| [21] | Appl. No. | 740,363 |
| [22] | Filed | June 26, 1968 |
| [45] | Patented | Jan. 12, 1971 |
| [73] | Assignee | North American Rockwell Corporation |

[54] SHOCK ABSORBER
3 Claims, 9 Drawing Figs.

[52] U.S. Cl. .................................................. 267/116,
114/219, 188/266
[51] Int. Cl. .................................................. F16f 9/10,
F16f 5/00
[50] Field of Search .................................... 188/1B, 87;
114/219; 293/51F; 267/113, 116, 1, 118, 121—2,
139, 140; 248/(Inquired)

[56] References Cited
UNITED STATES PATENTS

| 1,166,811 | 1/1916 | Bowers | 114/219UX |
| 2,960,055 | 11/1960 | Tomek | 114/219 |
| 3,254,883 | 6/1966 | Morgan | 293/51UX |

*Primary Examiner*—Duane A. Reger
*Attorneys*—William R. Lane, L. Lee Humphries and Edward Dugas

ABSTRACT: An improved shock absorber having a chamber wall that defines a chamber volume in fluid communication with a working fluid through a plurality of apertures in the chamber wall which control the expulsion rate of the fluid from the chamber volume when the chamber wall is deformed.

PATENTED JAN 12 1971                 3,554,527
SHEET 1 OF 2
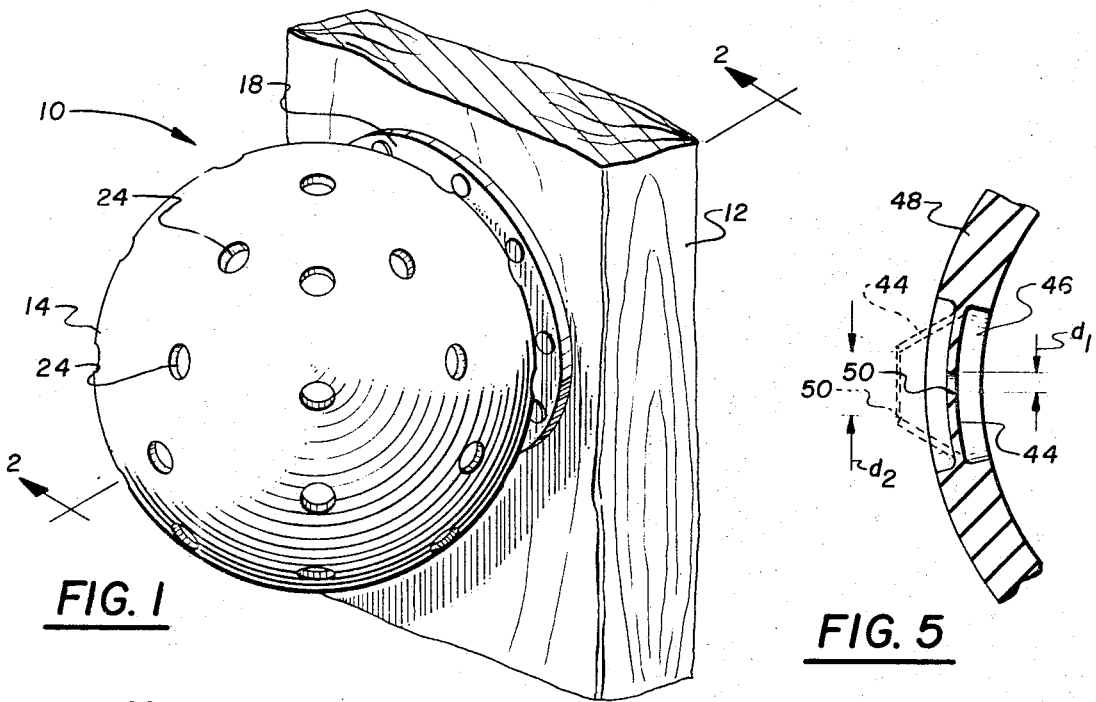
FIG. 1
FIG. 5
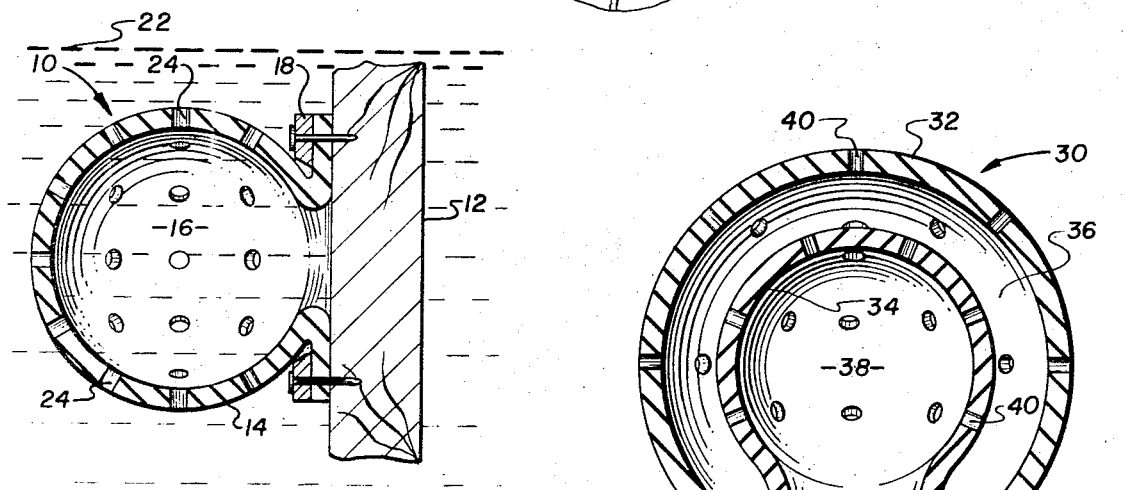
FIG. 2
FIG. 4
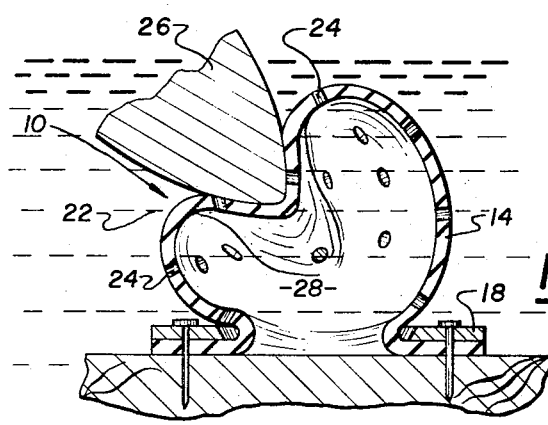
FIG. 3
INVENTOR.
LESTER G. HALL
BY

INVENTOR.
LESTER G. HALL

SHOCK ABSORBER

BACKGROUND OF THE INVENTION

Shock absorbers are well-known devices that absorb the energy of sudden impulses or shocks in machinery of structures; for example, automobile shock absorbers are used to damp the oscillations of the spring supported body during operation. Another type of shock absorber decelerates a rapidly moving object to a zero velocity without structural damage to the object, while other shock absorbers minimize structural damage to a moving object that engages a fixed object, e.g. a string of automobile tires hanging along the fender strake of a boat.

Known shock absorbers generally use a self-contained working fluid that follows a predetermined pattern through suitable internal valving and/or metering apertures within the several compartments of the shock absorber so that the shock absorber unit converts the kinetic energy induced into the system to heat energy. The more complex the shock absorber, the greater the expense. When the structural complexity of the shock absorber is minimized, a relatively inexpensive shock absorber results but the operating efficiency of the shock absorber is also minimized. For example, each automobile tire in the string of tires along the fender strake of a boat is relatively inexpensive but the tire is also relatively inefficient because only the inherent spring characteristic of the tire carcass absorbs the energy.

OBJECTS OF THE INVENTION

Accordingly, it is an object of the invention to provide a new and improved shock absorber.

Another object of the invention is to provide a shock absorber that uses an ambient fluid environment as the shock absorber working fluid.

An additional object of the invention is to provide a new and improved shock absorber having improved efficiency by variable metering of the working fluid.

It is also an object of the invention to provide a shock absorber that has a minimum number of structural components, is relatively inexpensive, and is efficient.

SUMMARY OF THE INVENTION

Briefly in accordance with one form of the invention, an improved shock absorber is provided having a chamber wall defining a chamber volume. The chamber volume is in fluid communication with an ambient fluid through one or more apertures in the chamber wall. The size of the apertures controls the expulsion rate of the fluid from the chamber volume when the chamber wall is deformed so that a shock absorbing or damping effect results.

Further objects, features, and attending advantages of the invention will be apparent when the following description is read in conjunction with accompanying drawings.

BRIEF DESCRIPTION OF THE DRAWINGS

FIG. 1 is a perspective view of one form of shock absorber formed in accordance with the invention;

FIG. 2 is a sectional view, partly broken away, along the line 2-2 of FIG. 1;

FIG. 3 is the sectional view of FIG. 2 in an operational mode;

FIG. 4 is a sectional view, partly broken away, of another form of shock absorber formed in accordance with the invention;

FIG. 5 is an enlarged sectional view of a portion of another form of shock absorber formed in accordance with the invention;

DESCRIPTION OF THE INVENTION

Figure 6:
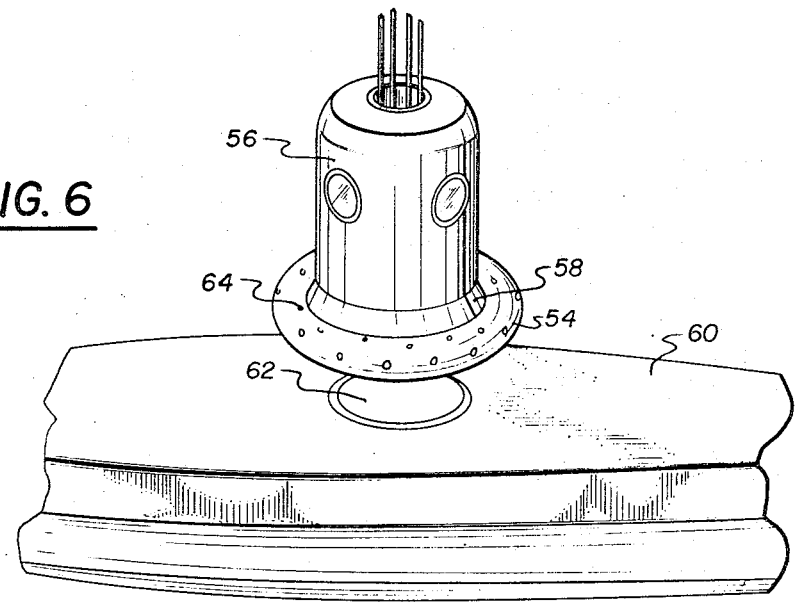
FIG. 6 is a perspective view of another form of shock absorber formed in accordance with the invention in an operational arrangement.

Referring to FIGS. 1 and 2, one form of shock absorber 10 cooperates with a suitable support 12 which can be an underwater piling, fender strake of a boat, dock, subsurface vehicle, or the like. The shock absorber 10 as illustrated has a chamber means, such as chamber wall 14 that has a generally spherical contour and defines an internal chamber volume 16. The chamber wall 14 is relatively flexible and has the capacity of returning to a normal or original shape after deformation. The chamber wall 14 has an attachment means such as flange 18 that can be integrally formed with the chamber wall as illustrated or can be a separate structural member physically cooperating with the chamber wall for the purpose of attaching the shock absorber 10 to the support 12. Either bolts, screws, nails, bonding, or the like can be used to attach the flange 18 to the support 12 generally as illustrated.

The shock absorber 10 of FIGS. 1 and 2 is positioned in a fluid means or working fluid that comprises the ambient environment in which the shock absorber finds use. As particularly illustrated by FIG. 2, the working fluid in the embodiment shown is water 22 in which the shock absorber 10 an be totally or partially submerged. The working fluid 22 is placed in fluid communication with the chamber volume 16 through a plurality of aperture means such as similar openings or apertures 24 that are suitably spaced in the chamber wall 14. It is contemplated that the apertures or foramen can also be spaced holed, slots, ports, or the like. (See FIG. 9)

Referring to FIGS. 2 and 3, the first or at rest chamber volume 16 of FIG. 2 has a determinable volume $V_1$. When an object 26 engages the shock absorber 10, the chamber wall 14 yields, flexes and undergoes deformation. The deformation rate of the chamber wall 14 is determined by the spring rate of the chamber wall and by the rate that the working fluid 22 "extrudes" or vents through the apertures 24 from the chamber volume 16. The working fluid 22 vents at a determinable metered rate and becomes an energy transfer medium so that the inherent spring characteristic of the chamber wall 14 is reinforced by the finite time required to vent the working fluid from the first chamber volume 16 to a second or deformed chamber volume 28 of FIG. 3 that has a determinable, yet varying, volume. The kinetic energy induced into the system by the moving object 26 is dissipated by viscous friction through the venting of the working fluid. The venting of the working fluid at a controlled rate is determined by the proper sizing of the apertures 24; the working fluid thus can be metered to produce any desired rate of energy absorption. The multiaperture configuration as illustrated permits greater flexibility for various shock absorber problems that may be encountered.

In FIG. 3, as object 26 moves away from the shock absorber 10, the chamber wall 14 will return to its normal or original shape as illustrated by FIG. 2. In returning to its original shape, the apertures 24 in the chamber wall 14 permit the ingress of working fluid from the ambient fluid environment to the chamber volume so that the shock absorber 10 can repeat the foregoing shock-absorbing or damping operation. Thus, a repeatable shock absorber is provided by my invention.

Referring now to FIG. 4, another form of shock absorber 30, that functions in a manner similar to that described for the shock absorber 10 of FIGS. 1 through 3, has a first chamber wall 32 and an internal chamber wall 34 that are suitably spaced apart by a first chamber volume 36. Chamber wall 34 defines an internal chamber volume 38. Both the outer and inner chamber walls 32 and 34, respectively, have a plurality of apertures 40. It is contemplated that multiple chamber walls can be used, and it is also contemplated that the apertures 40 can be sized differently, particularly for different chamber walls, so that the total aperture area can be different for each wall. The operating characteristics of the shock absorber 30 as illustrated by FIG. 4 are similar to those previously described for the shock absorber 10 of FIGS. 1 through 3.

Figure 7:
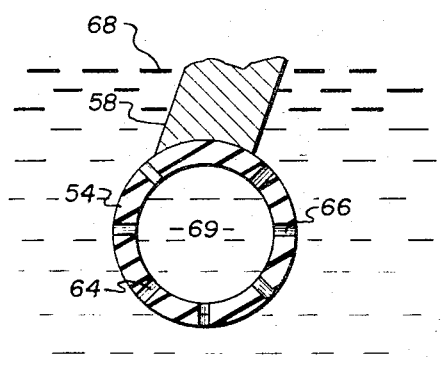
FIG. 7 is a sectional view of the shock absorber of FIG. 6 in an at rest mode.
Figure 8:
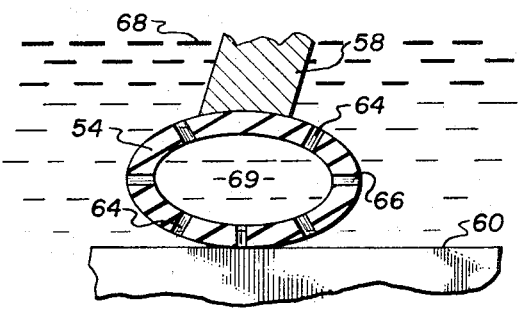
FIG. 8 is the shock absorber of FIG. 7 in a deformed mode.

Referring to FIG. 5, another form of aperture means for the shock absorber of my invention has a flexible membrane means, such as membrane 44 attached to or integral with the inner wall 46 that defines an aperture or plurality of apertures in a chamber wall 48. The membrane 44 can have one or more ports, such as port 50. Each port 50 has dimension $d_1$ (diameter in FIG. 5) in a normal or rest position, i.e. the position of the shock absorber prior to deformation of the chamber wall 48. When the shock absorber is deformed, the internal pressure in the chamber volume increases and flexes the membrane 44 outwardly toward a maximum membrane deflection as shown by the dashed-line membrane position in FIG. 5. Thus, as the rate of deformation of the chamber wall 48 increases, the dimension of the port 50 as shown by the dashed lines also increases to a maximum $d_2$. The increase in port dimension from $d_1$ to $d_2$ results in a variable metering rate. This variable metering rate increases the efficiency of the shock absorber Referring to FIGS. 6—8, another form of shock absorber similar to those described and illustrated can be formed as a torus shock absorber 54. Torus shock absorber 54 can be used with a submersible vehicle 56 having a skirt portion 58 that is connected in a conventional manner to the shock absorber torus. The submersible 56 is adapted to mate with an undersea vessel or habitat 60 which permits the dry transfer of personnel and/or supplies between the submersible and the undersea habitat through a suitable hatch 62. In FIG. 7, the torus shock absorber 54 is at a normal mode position and can have a generally circular cross section as shown. The torus shock absorber 54 has similar apertures 64 in the torus chamber wall 66 that place the ambient working fluid, e.g. water 68, in fluid communication with the chamber volume 69. When the submersible 56 contacts the habitat 60 as illustrated by FIG. 8, the torus shock absorber 54 deforms to a generally elliptical cross section. As the torus shock absorber 54 deforms, the working fluid extrudes from the chamber volume 69 through the similar apertures 64 in the torus chamber wall 66 to the ambient fluid environment 68. The shock-absorbing characteristics of the torus 58 thus permit a gentle mating between the submersible 56 and the undersea habitat 60. It is contemplated that prior to the contact between the submersible 56 and the undersea habitat 60 as shown by FIG. 7, a suitable jet pump could force a working fluid through apertures 64 and thereby brush or sweep the area surrounding the hatch 62 free of debris and accumulated silt so that a clean surface-to-surface contact can be made between the chamber wall 66 of the torus shock absorber 54 and the surface of the undersea habitat 60.

Figure 9:
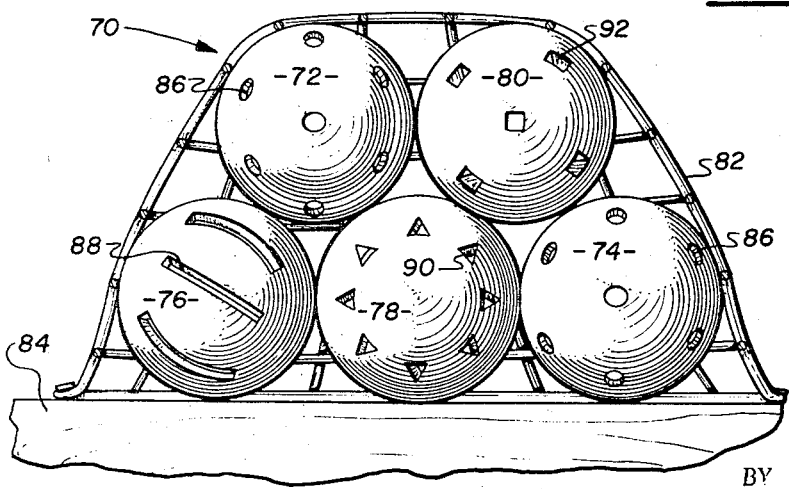
FIG. 9 is a perspective view of another form of shock absorber formed in accordance with the invention.

Referring to FIG. 9, another form of shock absorber 70 functions in a manner similar to the shock absorbers previously described and illustrated. A plurality of shock absorber spheres 72, 74, 76, 78, and 80 are retained in a loosely packed array by a suitable positioning means, such as net 82 that can be attached by conventional means to a support 84. It is contemplated that the shock absorber spheres can also be free of any positioning means and, therefore, free to move as a loosely packed array. As illustrated by FIG. 9, the aperture means in the chamber walls of the respective shock absorbers can have a variety of forms. For example, shock absorber spheres 72 and 74 have circular apertures 86; shock absorber sphere 76 has slots 88; shock absorber sphere 78 has triangular apertures 90; and, shock absorber sphere 80 has generally rectangular ports 92. Regardless of the particular aperture means chosen for the shock absorber formed in accordance with the invention, the operating principle remains the same, viz, the shock absorber working fluid vents to the ambient fluid environment as the chamber wall deforms.

As will be evidenced from the foregoing description, certain aspects of the invention are not limited to the particular details of construction as illustrated, and it is contemplated that other modifications and applications will occur to those skilled in the art. It is contemplated that the shock absorber could have a chamber wall which would be deformed under impact but would not return to its normal or original shape thus providing a nonrepeatable shock absorber. It is, therefore, intended that the appended claims shall cover such modifications and applications that do not depart from the true spirit and scope of the invention.

I claim:
1. A shock absorber in fluid communication with a working fluid, the shock absorber comprising:
chamber means having at least a first wall generally defining a first chamber volume;
aperture means in said wall placing said first chamber volume in fluid communication with the working fluid, said aperture means controlling the expulsion of the fluid from said first chamber volume when said first wall is deformed thereby defining a second chamber volume so that a shock-absorbing or damping effect is developed by the expulsion of fluid from said first chamber volume;
said chamber means includes:
a first chamber means having said first wall, and
a second chamber means having a second wall generally defining a third chamber volume within said first chamber volume, and
said aperture means includes:

a first aperture means in said first wall
a second aperture means in said second wall placing said third chamber volume in fluid communication with said first chamber volume.
2. The shock absorber of claim 1 in which the total area of said first aperture means is different from the total area of said second aperture means.
3. The shock absorber of claim 1 in which the total area of said first aperture means is equal to the total area of said second aperture means.